(12) United States Patent
Chan (10) Patent No.: US 10,948,703 B2
(45) Date of Patent: Mar. 16, 2021

(54) IMAGING SYSTEM AND METHOD WITH SCATTERING TO REDUCE SOURCE AUTO-FLUORESCENCE AND IMPROVE UNIFORMITY

(71) Applicant: Molecular Devices, LLC, San Jose, CA (US)

(72) Inventor: Matthew Chan, Palo Alto, CA (US)

(73) Assignee: Molecular Devices, LLC, San Jose, CA (US)

( * ) Notice: Subject to any disclaimer, the term of this patent is extended or adjusted under 35 U.S.C. 154(b) by 207 days.

(21) Appl. No.: 16/080,942

(22) PCT Filed: Feb. 15, 2017

(86) PCT No.: PCT/US2017/017957
§ 371 (c)(1),
(2) Date: Aug. 29, 2018

(87) PCT Pub. No.: WO2017/151317
PCT Pub. Date: Sep. 8, 2017

(65) Prior Publication Data
US 2019/0094511 A1    Mar. 28, 2019

Related U.S. Application Data

(60) Provisional application No. 62/301,760, filed on Mar. 1, 2016.

(51) Int. Cl.
*G02B 21/00* (2006.01)
*G01N 21/25* (2006.01)
(Continued)

(52) U.S. Cl.
CPC ....... *G02B 21/0052* (2013.01); *G01N 21/251* (2013.01); *G01N 21/6458* (2013.01);
(Continued)

(58) Field of Classification Search
CPC .......... G02B 21/0052; G02B 21/067; G02B 21/088; G02B 21/16; G01N 21/251;
(Continued)

(56) References Cited

U.S. PATENT DOCUMENTS 7,397,602 B2 *   7/2008   Endo ............... G02B 21/16
                                              356/317
2007/0211460 A1 * 9/2007  Ravkin ............ G02B 21/086
                                              362/231

(Continued)

OTHER PUBLICATIONS

International Search Report and Written Opinion for PCT/US2017/017957 dated Apr. 21, 2017.

*Primary Examiner* — Collin X Beatty (57) ABSTRACT

Imaging systems and methods with scattering to reduce source auto-fluorescence and improve uniformity. In some embodiments, the system may include a plurality of trans-illumination light sources configured to irradiate an examination region with different colors of trans-illumination light, while a same diffuser is present in each optical path from the trans-illumination light sources to the examination region. The system also may comprise an excitation light source configured to irradiate the examination region with excitation light. The system may be configured to irradiate the examination region with each of the trans-illumination light sources and, optionally, with the excitation light source, without moving parts in any of the optical paths from the trans-illumination light sources. The system further may comprise an image detector configured to detect grayscale images of the examination region, and a processor configured to create a color trans-illumination image from grayscale images.

19 Claims, 8 Drawing Sheets

(51) Int. Cl.
*G01N 21/64* (2006.01)
*G02B 21/16* (2006.01)
*G02B 21/08* (2006.01)
*G02B 21/06* (2006.01)

(52) U.S. Cl.
CPC ......... *G01N 21/6486* (2013.01); *G02B 21/06* (2013.01); *G02B 21/088* (2013.01); *G02B 21/16* (2013.01); *G01N 2201/0627* (2013.01); *G01N 2201/0631* (2013.01); *G01N 2201/0634* (2013.01)

(58) Field of Classification Search
CPC ....... G01N 21/6486; G01N 2201/0627; G01N 2201/0631; G01N 2201/0634
USPC ......................................................... 359/385
See application file for complete search history.

(56) References Cited

U.S. PATENT DOCUMENTS

| 2010/0085635 A1* | 4/2010 | Verboven ............... G01N 21/87 359/382 |
| 2013/0027770 A1 | 1/2013 | Ganser et al. |
| 2015/0042782 A1 | 2/2015 | Koga |

\* cited by examiner

IMAGING SYSTEM AND METHOD WITH SCATTERING TO REDUCE SOURCE AUTO-FLUORESCENCE AND IMPROVE UNIFORMITY

RELATED APPLICATION

This application claims priority to U.S. provisional application No. 62/301,760 filed on Mar. 1, 2016 the content of which is incorporated herein by reference in its entirety.

INTRODUCTION

A microscope imaging system can collect images of samples containing small objects such as cells. The imaging system may be equipped to collect images of a sample in different illumination modes. For example, the system may be configured to collect trans-illumination images in a trans-illumination mode in which light is detected that has passed through the sample, and fluorescence images in an epi-illumination mode in which fluorescence emission from the sample is detected.

The incorporation of trans- and epi-illumination modes into the same imaging system poses challenges. Trans-illumination images are preferably in color, which allows effective use of stains to improve contrast and distinguish sample components and features. Nevertheless, if the system has only one camera, a monochrome camera is generally needed for its higher sensitivity to detect weak fluorescence and its higher spatial resolution over a traditional color camera. Color trans-illumination images can be created digitally from grayscale images detected during separate trans-illumination with red, green, and blue light from corresponding sources. However, proper alignment of the three sources can be problematic. Also, moving parts such as shutters or filters may be needed to isolate the optical paths of the trans-illumination mode from one another and from the epi-illumination mode.

SUMMARY

The present disclosure provides imaging systems and methods with scattering to reduce source auto-fluorescence and improve uniformity. In some embodiments, the system may include a plurality of trans-illumination light sources configured to irradiate an examination region with different colors of trans-illumination light, while a same diffuser is present in each optical path from the trans-illumination light sources to the examination region. The system also may comprise an excitation light source configured to irradiate the examination region with excitation light. The system may be configured to irradiate the examination region with each of the trans-illumination light sources and, optionally, with the excitation light source, without moving parts in any of the optical paths from the trans-illumination light sources. The system further may comprise an image detector configured to detect grayscale images of the examination region, and a processor configured to create a color trans-illumination image from grayscale images.

DETAILED DESCRIPTION

The present disclosure provides imaging systems and methods with scattering to reduce source auto-fluorescence and improve uniformity. In some embodiments, the system may include a plurality of trans-illumination light sources configured to irradiate an examination region with different colors of trans-illumination light, while a same diffuser is present in each optical path from the trans-illumination light sources to the examination region. The system also may comprise an excitation light source configured to irradiate the examination region with excitation light. The system may be configured to irradiate the examination region with each of the trans-illumination light sources and, optionally, with the excitation light source, without moving one or more parts in any of the optical paths from the trans-illumination light sources. The system further may comprise an image detector configured to detect grayscale images of the examination region, and a processor configured to create a color trans-illumination image from grayscale images.

The systems and methods of the present disclosure may offer various advantages over earlier imaging systems. Excitation light incident on the trans-illumination light sources can excite background fluorescence/phosphorescence from fluorophores/phosphors near or in these light sources. This light emission is described herein as source "auto-fluorescence." A portion of the light emitted may at least generally follow one or more of the optical paths from the trans-illumination light sources all the way to the image detector, which increases noise in the fluorescence images detected. The systems and methods of the present disclosure utilize a diffuser, instead of a shutter or filter, to reduce the efficiency with which excitation light reaches the trans-illumination light sources, thereby decreasing source auto-fluorescence. The diffuser also reduces the efficiency with which the light emitted by source auto-fluorescence travels to the image detector. The diffuser also or alternatively may increase the uniformity and overlap of red, green, and blue trans-illumination light beams at the examination region, to enable colorimetric imaging with a grayscale detector. In some embodiments, the diffuser may allow the trans-illumination light sources to be provided by a four-channel LED having an array of dies producing red, green and blue light. The diffuser further may allow the trans-illumination light sources to be changed to a different trans-illumination light source(s) (e.g., an ultraviolet and/or infrared light source(s)) without the need for realignment of the system's optics. The diffuser also may allow the system to be more compact with fewer moving parts.

Further aspects of the present disclosure are described in the following sections: (I) overview of colorimetric imaging systems with scattering, (II) schematic comparison of colorimetric imaging systems, and (III) examples.

I. Overview of Colorimetric Imaging Systems with Scattering

Figure 1A:
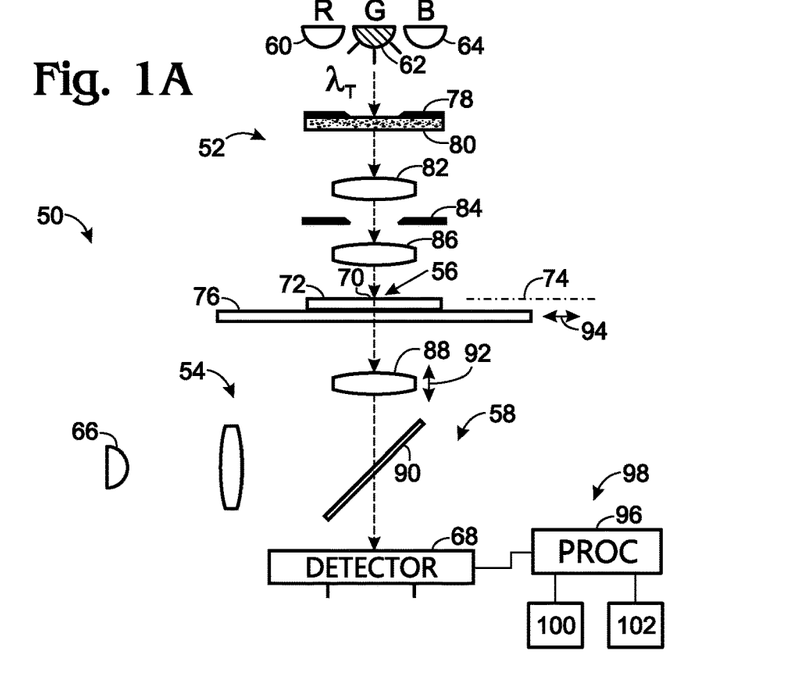
FIG. 1A is a schematic view of an exemplary imaging system configured to detect trans-illumination images and photoluminescence images of an examination region with a grayscale image detector, and to create a color image from a plurality of the grayscale trans-illumination images, with the system operating in a trans-illumination mode in which trans-illumination light travels from a trans-illumination light source to a diffuser, from the diffuser to the examination region, and from the examination region to the image detector, in accordance with aspects of the present disclosure.
Figure 1B:
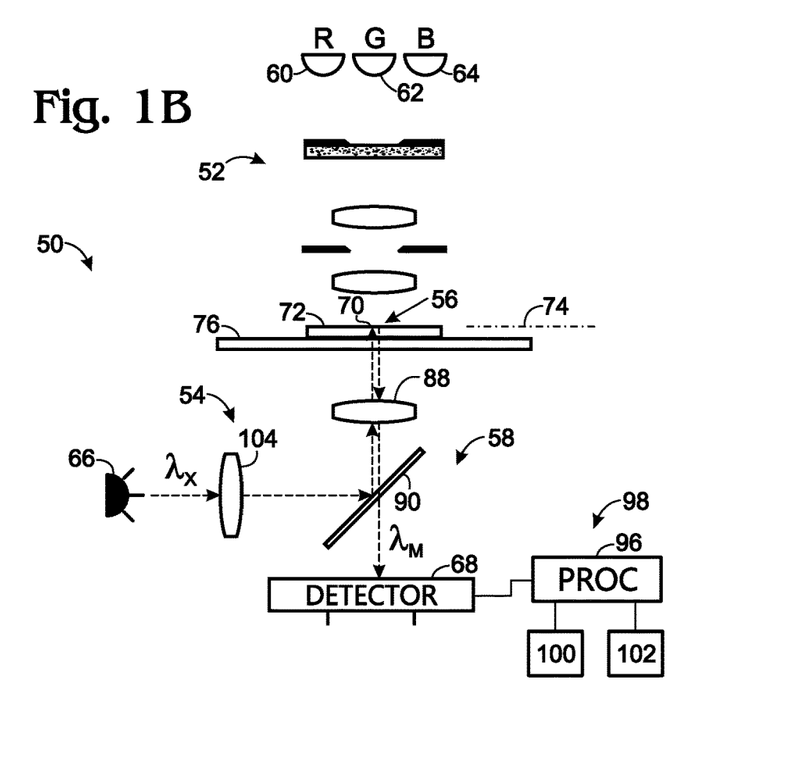
FIG. 1B is another schematic view of the imaging system of FIG. 1A, with the system operating in epi-illumination mode in which excitation light travels from an excitation light source to the examination region to induce photoluminescence, which in turn travels from the examination region to the image detector, in accordance with aspects of the present disclosure.
Figure 2A:
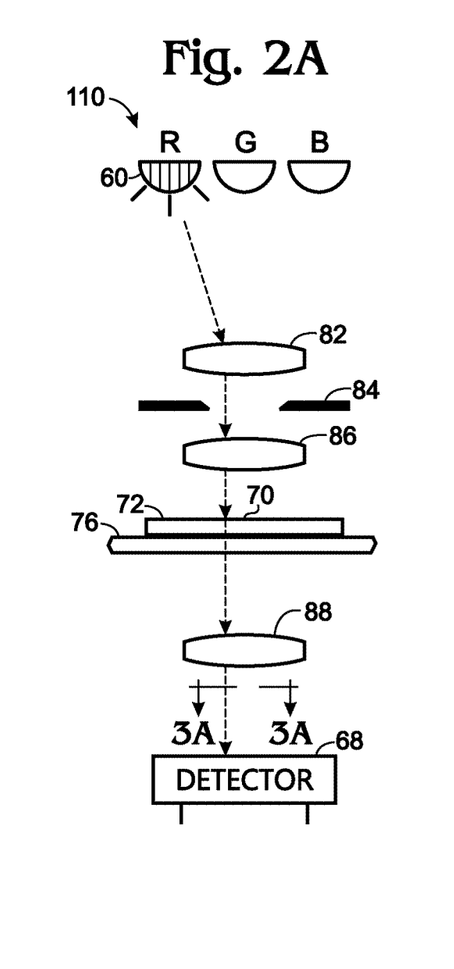
FIGS. 2A-2C are schematic, simplified views of a trans-illumination-only embodiment of the imaging system of FIGS. 1A and 1B constructed without the diffuser, and illustrating how the absence of a diffuser can result in offset optical paths followed by trans-illumination light from red (R), green (G), and blue (B) trans-illumination light sources.
Figure 2B:
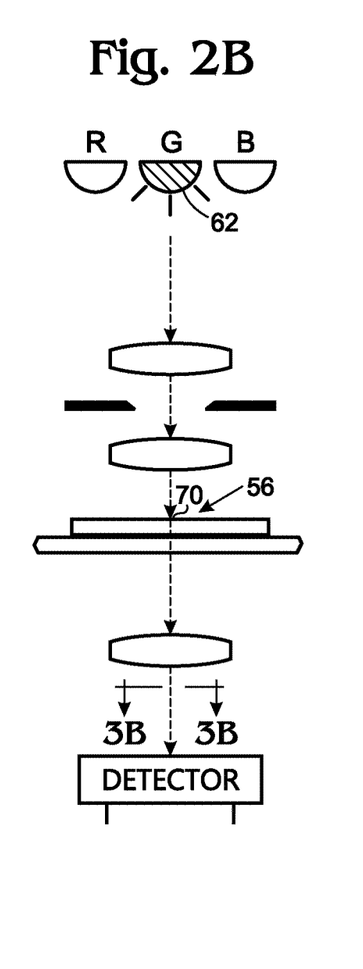
Figure 2C:
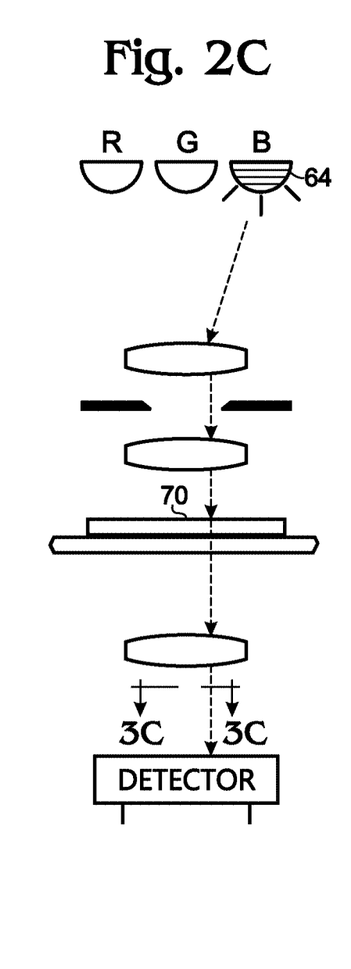

This section provides an overview of an exemplary microscope imaging system 50 for trans-illumination (e.g., brightfield) colorimetric imaging and epi-illumination (e.g., photoluminescence) imaging; see FIGS. 1A and 1B. System 50 is operating in a trans-illumination mode in FIGS. 1A and 1n an epi-illumination mode in FIG. 1B.

Imaging system 50 includes a trans-illumination portion 52 and an epi-illumination portion 54 each configured to irradiate an examination region 56 with light, and also includes a detection portion 58 configured to collect and detect light from the examination region. Each of portions 52 and 54 may be described as a module or an assembly. The terms "irradiate" and "illuminate" and corresponding derivatives thereof are used interchangeably in the present disclosure. The term "light," as used herein, may include optical radiation of any suitable wavelength. Accordingly, light may be visible radiation, ultraviolet radiation, infrared radiation, or any combination thereof.

The trans- and epi-illumination portions 52 and 54 each irradiate the examination region by producing light and directing some of the light to the examination region. Trans-illumination portion 52 may contain a plurality of trans-illumination light sources, such as colorimetric sources 60, 62, and 64, and the epi-illumination portion may contain at least one epi-illumination light source, such as an excitation light source 66. The trans-illumination light sources may include two or more light sources generating light representing different spectral bands and/or of different colors from one another. For example, in the depicted embodiment, trans-illumination portion 52 contains three visible light sources, namely, a red (R) light source 60, a green (G) light source 62, and a blue (B) light source. In some embodiments, the system may include a plurality of trans-illumination light sources of each color, e.g., two or more red light sources 60, two or more green light sources 62, and/or two more blue light sources 64. Each light source may be of any suitable type, such as a light-emitting diode(s), a mercury arc lamp, a laser, or the like.

Detection portion 58 comprises an image detector 68 to detect images of examination region 56, particularly while a sample 70 held by a sample holder 72 is present in the examination region. Sample 70 may be disposed in a specimen plane 74 defined by the examination region, generally a horizontal plane (also called an xy plane). Sample holder 72 may be supported in examination region 56 by a stage 76.

The image detector may be a grayscale (monochrome) image detector or a color image detector. A grayscale image detector detects grayscale images, where each image pixel carries only intensity information, while a color image detector detects color images in which each image pixel carries intensity and wavelength/color information (e.g., three intensities for three respective wavelengths/colors). Image detector 68 may be any device for collecting images of a sample (and/or examination region). Exemplary image detectors are array detectors, such as charge-coupled device (CCD) sensors, active pixel sensors (e.g., complementary metal-oxide-semiconductor (CMOS) sensors, N-type metal-oxide-semiconductor (NMOS) sensors, etc.), or the like.

The trans-illumination and epi-illumination modes shown in FIGS. 1A and 1B, respectively, are defined according to the sides of specimen plane 74 on which irradiation and collection/detection are conducted. In the trans-illumination mode of FIG. 1A, irradiation and collection/detection occur on opposite sides of the specimen plane, while in the epi-illumination mode of FIG. 1B, irradiation and collection/detection occur on the same sides of the specimen plane. For example, in the depicted embodiment, trans-illumination light sources 60, 62, and 64 are disposed above specimen plane 74, and image detector 68 is disposed below the specimen plane. In contrast, excitation light source 66 and image detector 68 are both disposed below the specimen plane. In other embodiments, the system may be inverted such that the trans-illumination light sources are located below the specimen plane and the excitation light source and the image detector are located above the specimen plane.

Light, indicated by dashed arrows in FIGS. 1A and 1B, travels from each light source to the examination region along an irradiation optical path, and from the examination region to image detector 68 along a detection optical path. Each irradiation optical path may approach sample 70 along a z-axis, such as the same z-axis. Each irradiation optical path is determined by the light source and operatively-associated optics composed of one or more optical elements.

An optical element may be any device or structure that collects, directs, and/or focuses light and/or at least partially blocks light. An optical element may function by any suitable mechanism, such as reflecting, refracting, scattering, diffracting, absorbing, and/or filtering light, among others. Exemplary optical elements include lenses, mirrors, diffusers, gratings, prisms, filters, apertures, masks, beam-splitters, transmissive fibers (fiber optics), or the like. Each optical element may be dedicated to a single optical path, or shared by two or more optical paths. The optical elements of system 50 may provide any suitable degree of image magnification.

FIG. 1A shows imaging system 50 operating in trans-illumination mode with only green light source 62 activated. Trans-illumination light ($\lambda_T$) generated by source 62 may travel on an optical path through an optical aperture 78, a transmissive diffuser 80, a collection lens 82, another optical aperture 84, another lens 86, and to the examination region. The light interacts with sample 70 while passing through the sample, and then passes through an objective 88 and a beam-splitter 90, and is incident on a photosensitive area of image detector 68 positioned optically downstream of the beam-splitter. The image detector collects images of sample 70 by detecting transmitted light. The images acquired in the trans-illumination mode interchangeably may be called trans-illumination images or brightfield images.

The positional relationship of sample 70 (and/or examination region 56) and objective 88 relative to one another defines the focal position (also called the focus) of the system. The distance of the objective from the sample along the z-axis adjustably changes the focal position and determines whether or not the sample is in focus or out of focus in the image plane of the image detector. The focal position may be adjusted by moving sample 70, objective 88, or both. In exemplary embodiments, the focal position is adjusted by moving the objective. The objective may be moved along the z-axis by a drive mechanism 92 operatively connected to the objective, while stage 76 (and sample 70) remain stationary. In other embodiments, drive mechanism 92 may be operatively connected to stage 76, such that the position of the stage along the z-axis is adjusted while the objective remains stationary. A stage horizontal drive mechanism 94 also may be operatively associated with stage 76 to move the stage (and sample 70) in two dimensions parallel to specimen plane 74.

Trans-illumination light is scattered by diffuser 80 at a position upstream of the sample, which homogenizes the light to improve the uniformity of irradiation of the examination region in the field of view. The diffuser may be configured to scatter light from each trans-illumination light source (and from the excitation light source) substantially isotropically over any suitable solid angle, such as a solid angle of at least $\pi$ steradians or about $2\pi$ steradians. Also, as described in more detail below, the diffuser may function to merge the optical paths of light sources 60, 62, and 64 with one another, such that light from each of the sources follows the same optical path from the diffuser to the sample. The light sources may be disposed in an array and may be offset from one another transverse to a central optical axis extending from light sources 60, 62, and 64 (considered collectively) to the examination region. The merging of optical paths by diffuser 80 may improve alignment (increase overlap) of the light beams from sources 60, 62, and 64 with one another at the examination region.

Diffuser 80 may have any suitable structure and properties. The diffuser may produce radiance that is substantially Lambertian, namely, substantially the same apparent brightness at any angle of view. The diffuser of system 50 is a transmissive diffuser that scatters light as the light is transmitted through the diffuser. Exemplary transmissive diffusers include holographic diffusers, opal glass diffusers, ground glass diffusers, and grayed glass diffusers, among others. In other embodiments (e.g., see Example 1), the diffuser may be a reflective diffuser that scatters light as the light is reflected by the diffuser. Exemplary reflective diffusers include an irregular reflective surface.

Light sources 60, 62, and 64 may be configured to enable colorimetric imaging with grayscale image detector 68. Each light source may produce light representing a different spectral band (or wavelength regime), which may be absorbed differentially by a sample. Combining image data from grayscale images collected separately while the sample is separately irradiated with light from each of light sources 60, 62, and 64 (R, G, and B separately) allows a color image to be created. More generally, a color image can be created from grayscale images detected while serially irradiating the sample with different subsets/combinations of the R, G, and B light sources, such as (R, R+G, and R+G+B), (R+G, R+B, and G+B), or the like.

Trans-illumination portion 52 may be configured to allow serial colorimetric irradiation of a sample 70 (and/or examination region 56) with light sources 60, 62, and 64 (and/or different combinations thereof) by controlling (e.g., activating) the light sources serially or in different combinations without moving one or more parts in any of the optical paths from light sources 60, 62, and 64 to the examination region. In other words, the serial radiation may be performed while each of the optical paths from light sources 60, 62, and 64 to the examination region remains the same (ignoring any adjustment of the focus by moving the stage vertically, if permitted).

System 50 may include a processor 96, which may be in communication with and/or may control operation of any suitable combination of devices of system 50, and which may be equipped with any suitable algorithms for automating operation of the system. The processor may receive and process image data from image detector 68, and may control operation of the image detector, such as the timing of image detection. The processor also may create color images from grayscale images detected by the image detector. Processor 96 further may control objective and stage drive mechanisms 92, 94. Control of drive mechanisms 92, 94 may allow the system to automate imaging of multiple samples, and/or multiple locations within the same sample. The processor also may control switching among trans-illumination light sources and/or between trans-illumination and epi-illumination modes, and thus between collection of bright-field images and photoluminescence images.

Processor 96 may be provided by a computing system or computer 98. The computer may include a display 100, a user interface 102, a memory to store algorithms and data, and the like.

FIG. 1B shows imaging system 50 during epi-illumination of sample 70 with excitation light ($\lambda_X$) produced by excitation light source 66. (Light sources 60, 62, and 64 are not activated.) The excitation light may excite a photoluminophore (e.g., a fluorescent dye) in the sample, which causes the photoluminophore to photoluminesce, namely, to generate emitted light ($\lambda_M$) that is detected by image detector 68. The image detector detects photoluminescence images of sample 70 (and/or examination region 56). Photoluminescence includes any photo-induced emission of light, such as fluorescence, phosphorescence, and the like.

The excitation light and the emitted light may travel along partially overlapping optical paths. The excitation light may travel to sample 70 from excitation light source 66 via one or more optical elements, such as a collection lens 104, a spectral filter, beam-splitter 90, and objective 88. The emitted light may pass through objective 88, beam-splitter 90, and a spectral filter, before reaching the image detector.

System 50 may operate in epi-illumination mode while each optical path between light sources 60, 62, and 64 and the examination region remains open. Accordingly, some excitation light may reach a source assembly including each of light sources 60, 62, 64, to induce background autofluorescence by one or more photoluminescent substances present in the source assembly. However, the efficiency with which the excitation light is incident on the source assembly, and the efficiency with which photoluminescence from the source assembly reaches image detector 68 is very low, due in part to the presence of diffuser 80, as described in more detail below.

System 50 may switch between the trans- and epi-illumination modes of FIGS. 1A and 1B, in one or both directions (i.e., from trans- to epi- and/or from epi- to trans-), without moving any parts in any of the optical paths from light sources 60, 62, and 64 to examination region 56, and, optionally, without moving any parts in the optical path from excitation light source 66 to examination region 56.

Sample 70 may be any suitable material, substance, isolate, extract, particles, or the like. The sample may include biological cells and/or tissue to be imaged. The biological cells may be eukaryotic or prokaryotic, and may be alive or dead (e.g., fixed). Exemplary biological cells include established cells (cell lines), primary cells, cells from a tissue sample, cells from a clinical sample (e.g., a blood sample, a fluid aspirate, a tissue section, etc.), bacterial cells, or the like. The cells may produce a photoluminescent substance (e.g., green fluorescent protein (GFP)) or may be stained with a photoluminescent substance (e.g., after cells have been fixed).

Sample holder 72 may be any device for holding at least one sample or any array of spatially isolated samples. The sample holder may provide a substrate having at least one horizontal, upward-facing surface region (a location) on which biological cells or tissue of a sample may rest and/or be attached. The sample holder may have only one surface region for cell/tissue attachment, or multiple surface regions or compartments separated from one another. Each surface region may include a coating to encourage cell/tissue attachment. The coating may, for example, be poly-lysine, collagen, or the like. The coating may be located on a body of the sample holder, which may be formed of transparent plastic or glass, among others. Exemplary sample holders include slides, culture dishes, multi-well plates (e.g., having 4, 6, 8, 12, 24, 32, 48, or 96 wells, among others), or the like.

II. Schematic Comparison of Colorimetric Imaging Systems

This section describes schematic comparisons of exemplary imaging systems that differ from one another by the presence or absence of a diffuser, to illustrate potential advantages offered by a diffuser; see FIGS. 2A-2C, 3A-3C, 4A-4C, 5A-5C, and 6-9.

Figure 3A:
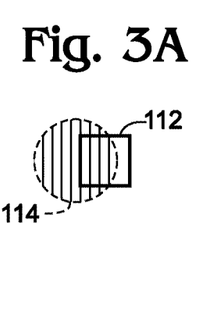
FIGS. 3A-3C are views of the imaging system of FIGS. 2A-2C, taken generally along lines 3A-3A, 3B-3B, 3C-3C, of FIGS. 2A-2C, respectively, and illustrating how the offset optical paths of FIGS. 2A-2C can produce non-uniform irradiation of the examination region.
Figure 3B:
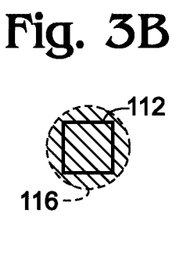
Figure 3C:
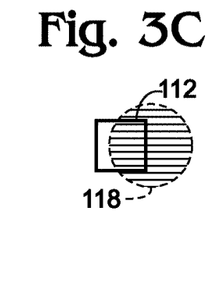

FIGS. 2A-2C and 3A-3C show schematic, simplified views of a trans-illumination-only embodiment 110 of imaging system 50 constructed without diffuser 80. The absence of diffuser 80 results in offset optical paths followed by trans-illumination light from red (R), green (G), and blue (B) trans-illumination light sources 60, 62, and 64 to sample 70 in examination region 56. More particularly, in FIGS. 2A and 2C, a red light beam from light source 60 and a blue light beam from light source 64 are offset at sample 70 to the left and right, respectively, relative to a green light beam from light source 62. The result of these offsets is shown in FIGS. 3A-3C, with respect to a photosensitive area 112 of detector 68. Red, green, and blue light beams 114, 116, and 118 are incident on area 112 with offsets from one another, with only green light beam 116 being centered on area 112.

Figure 4A:
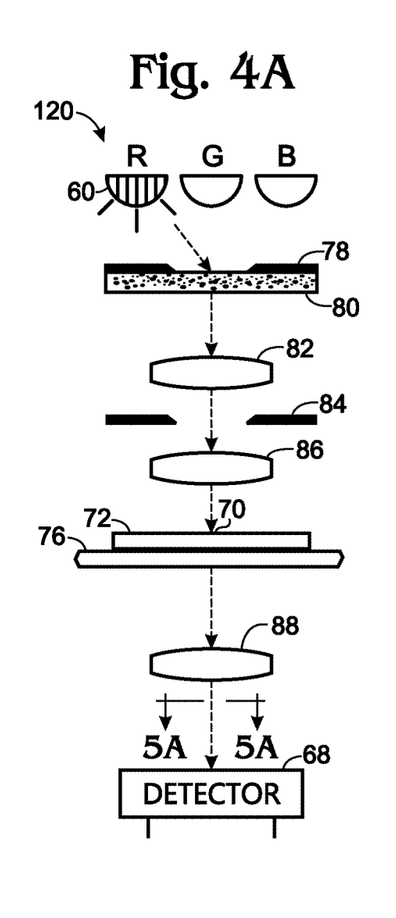
FIGS. 4A-4C are schematic, simplified views of a trans-illumination-only embodiment of the imaging system of FIGS. 1A and 1B constructed with the diffuser, and illustrating how, in contrast to FIGS. 2A-2C, the presence of a diffuser can align optical paths followed by trans-illumination light from red (R), green (G), and blue (B) trans-illumination light sources.
Figure 4B:
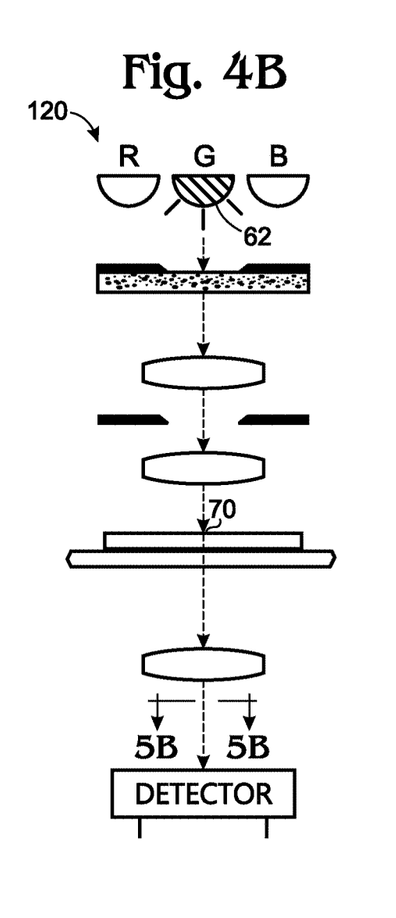
Figure 4C:
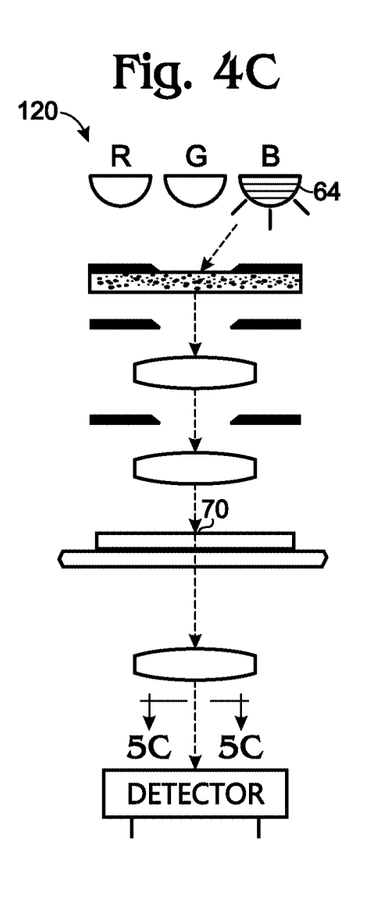
Figure 5A:
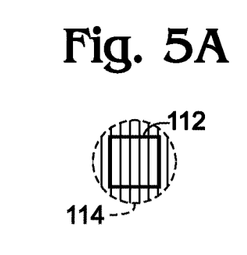
FIGS. 5A-5C are views of the imaging system of FIGS. 4A-4C, taken generally along lines 5A-5A, 5B-5B, 5C-5C, of FIGS. 4A-4C, respectively, and illustrating how the aligned optical paths of FIGS. 4A-4C can produce uniform irradiation of the examination region with each trans-illumination light source.
Figure 5B:
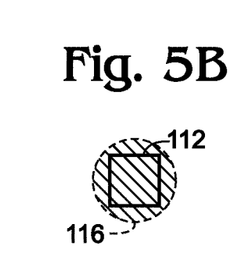
Figure 5C:
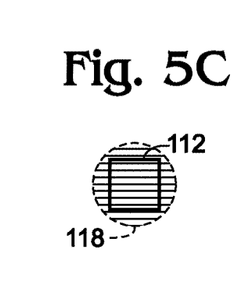

FIGS. 4A-4C and 5A-5C show schematic, simplified views of another trans-illumination-only embodiment 120 of imaging system 50, but constructed with diffuser 80, for comparison with system 110. FIGS. 4A-4C illustrate the ability of diffuser 80 to merge the optical paths followed by trans-illumination light from red (R), green (G), and blue (B) trans-illumination light sources 60, 62, and 64 at diffuser 80. In FIGS. 4A-4C, a red light beam from light source 60 and a blue light beam from light source 64 are now aligned with a green light beam from light source 62 at sample 70 and detector 68 (compare with system 110). In FIGS. 5A-5C, red, green, and blue light beams 114, 116, and 118 are each centered on area 112 to provide more uniform illumination than in system 110.

Figure 6:
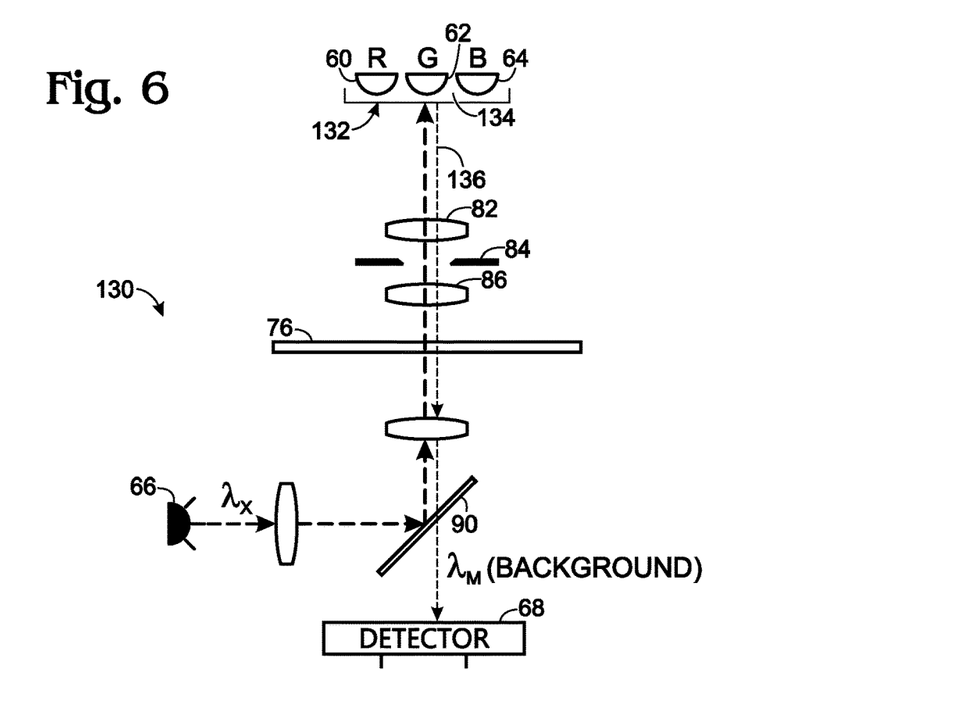
FIG. 6 is a schematic view of an embodiment of the imaging system of FIGS. 1A and 1B constructed without the diffuser, and illustrating how excitation light from the excitation light source can travel to and induce auto-fluorescence from an assembly of the trans-illumination light sources, which in turn can travel to the image detector, to increase background.

FIG. 6 shows an embodiment of 130 of imaging system 50 of FIGS. 1A and 1B constructed without diffuser 80 and operating in an epi-illumination mode while each of the optical paths from trans-illumination light sources 60, 62 and 64 is open. In other words, each of the optical paths is in its trans-illumination configuration that permits light to travel from the corresponding source to the examination region. The sample holder and sample present in FIGS. 1A and 1B have been omitted here and in FIG. 7 to focus the discussion on sample-independent, source auto-fluorescence originating from a source assembly 132 including light sources 60, 62, and 64. Source assembly 132 may include at least one photoluminescent substance 134 that emits light when irradiated with excitation light from light source 66. Substance 134 may, for example, be present in the light sources themselves (e.g., a doping agent), in an adhesive that mounts the light sources to a support, in the support, and/or the like. Accordingly, excitation light from excitation light source 66 can travel to and induce auto-fluorescence in source assembly 132. The resulting emitted light 136 ($\lambda_M$-background) can travel generally along one or more of the trans-illumination optical paths to stage 76 and then on to image detector 68, to undesirably increase the level of background light detected.

Figure 7:
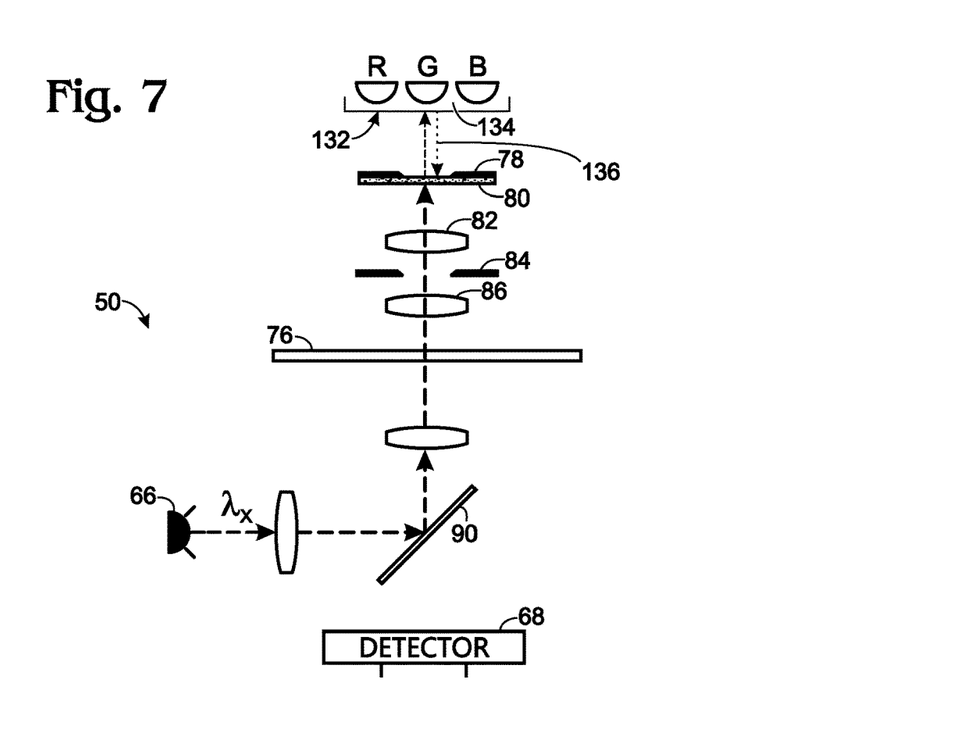
FIG. 7 is a schematic view of the imaging system of FIGS. 1A and 1B illustrating how, in comparison to FIG. 6, excitation light from the excitation light source less efficiently induces photoluminescence from the assembly of trans-illumination light sources, which in turn travels less efficiently to the image detector, resulting in less background.

FIG. 7 show system 50 in its epi-illumination mode and without a sample or sample holder, for comparison to FIG. 6. Excitation light from excitation light source 66 is incident on source assembly 132. However, diffuser 80, by scattering the excitation light, reduces the efficiency with which source assembly 132 is irradiated by light source 66. (Aperture 78 also blocks some of the scattered excitation light to further reduce coupling to the source assembly.) Accordingly, less background light 136 is produced by auto-fluorescence, as indicated by a dotted arrow instead of a dashed arrow (compare with FIG. 6). Aperture 78 and diffuser 80 also reduce the efficiency with which background light 136 travels generally along a trans-illumination path to the image detector, resulting in less background.

Figure 8:
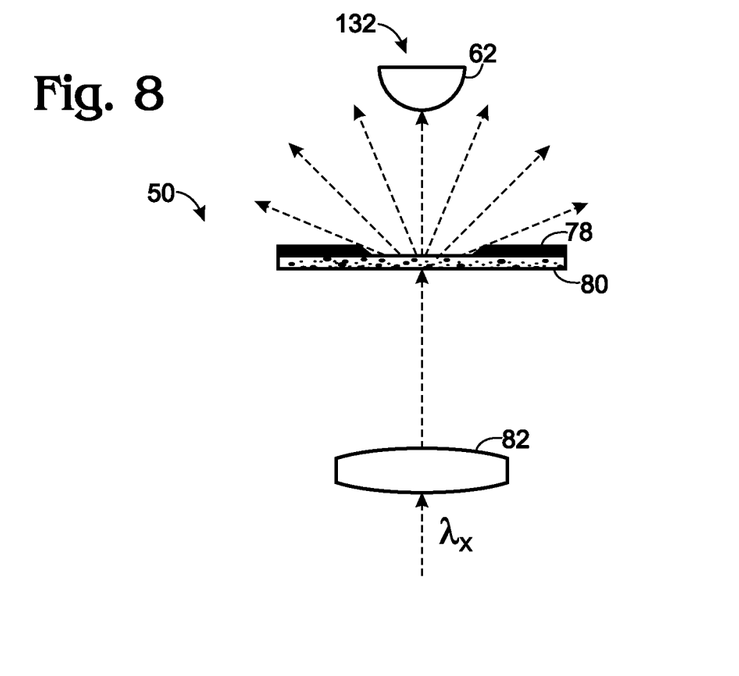
FIG. 8 is a schematic view of selected portions of FIG. 7 and illustrates how excitation light may be scattered by the diffuser such that less of the excitation light is incident on a trans-illumination light source.
Figure 9:
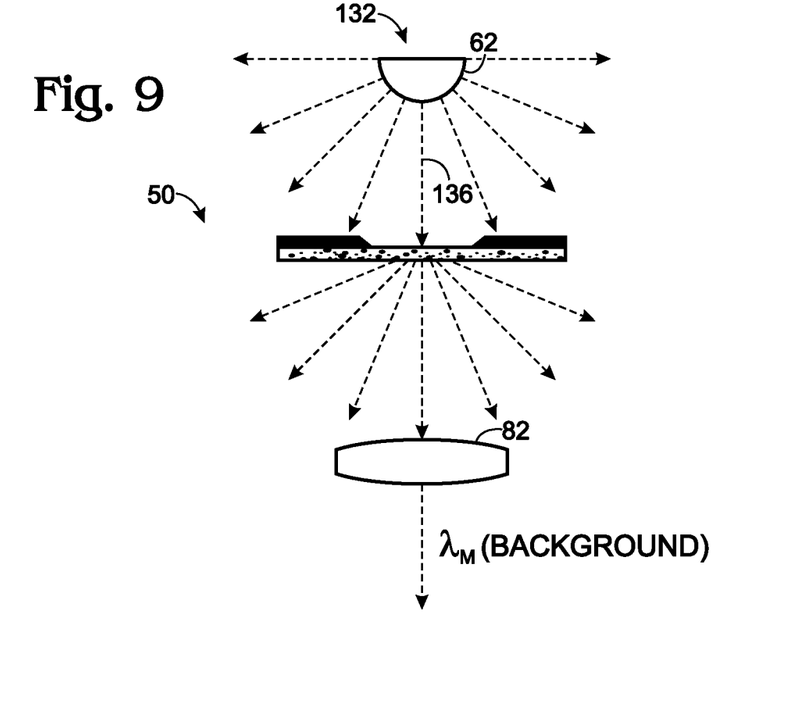
FIG. 9 is another schematic view of selected portions of FIG. 7 and illustrates how photoluminescence from a trans-illumination light source may be scattered by the diffuser such that less of the photoluminescence reaches the image detector.

FIGS. 8 and 9, respectively, schematically show parts of the excitation and emission paths of FIG. 7. (Only light source 62 of source assembly 132 is shown to simplify the presentation.) The roles of aperture 78 and diffuser 80 in reducing irradiation of source assembly 132 (FIG. 8), and in reducing propagation of emitted light 136 to the image detector (FIG. 9), are depicted.

III. Examples

The following examples describe further aspects of exemplary colorimetric imaging systems and methods including a diffuser to scatter light. These examples are intended for illustration and should not define or limit the entire scope of the present disclosure.

Colorimetric Imaging System with Reflective Diffuser

Figure 10:
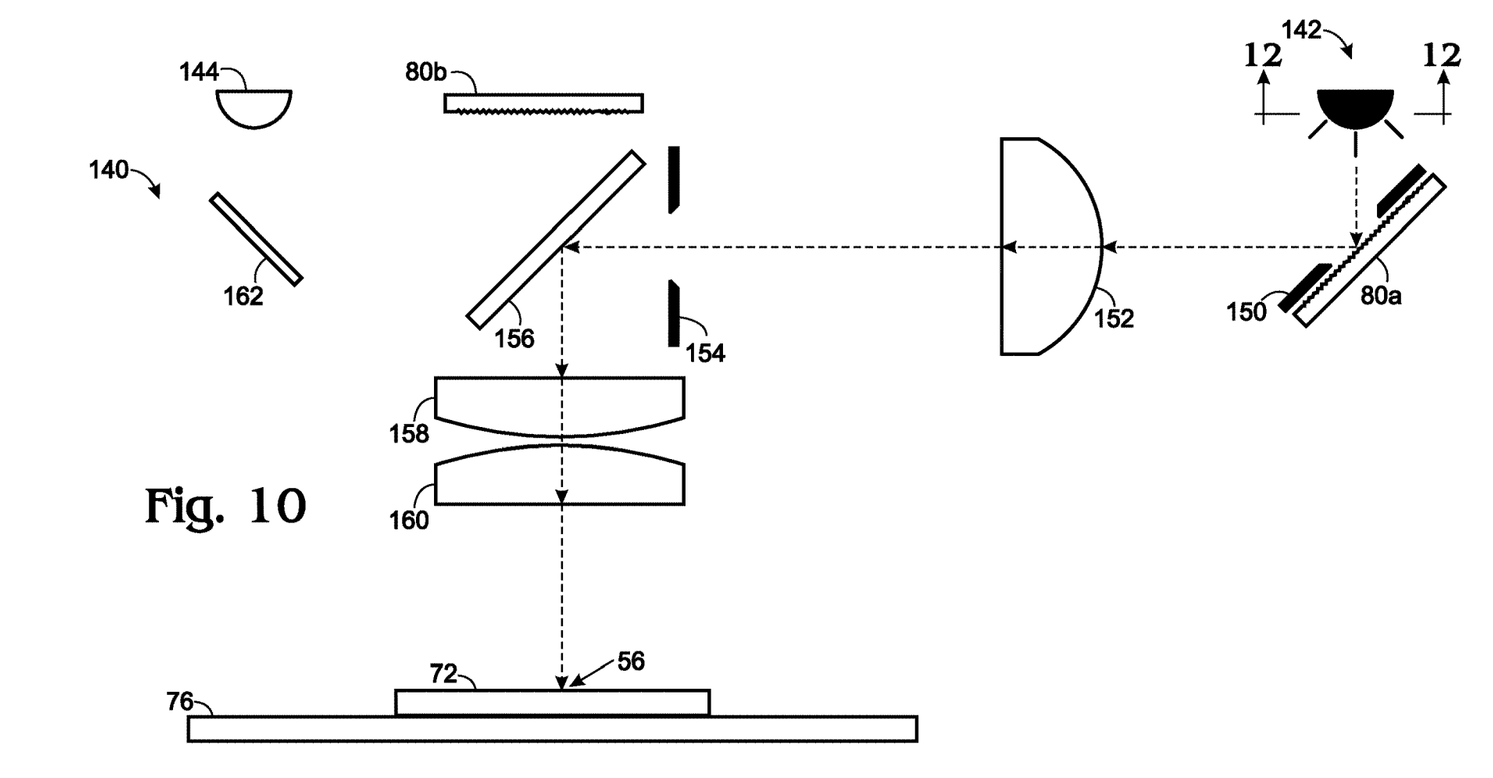
FIG. 10 is a schematic view of a trans-illumination portion of an embodiment of the imaging system of FIGS. 1A and 1B, with the trans-illumination portion including an image autofocusing light source and a set of colorimetric imaging light sources, and illustrating an optical path from the colorimetric imaging light sources to an examination region.
Figure 11:
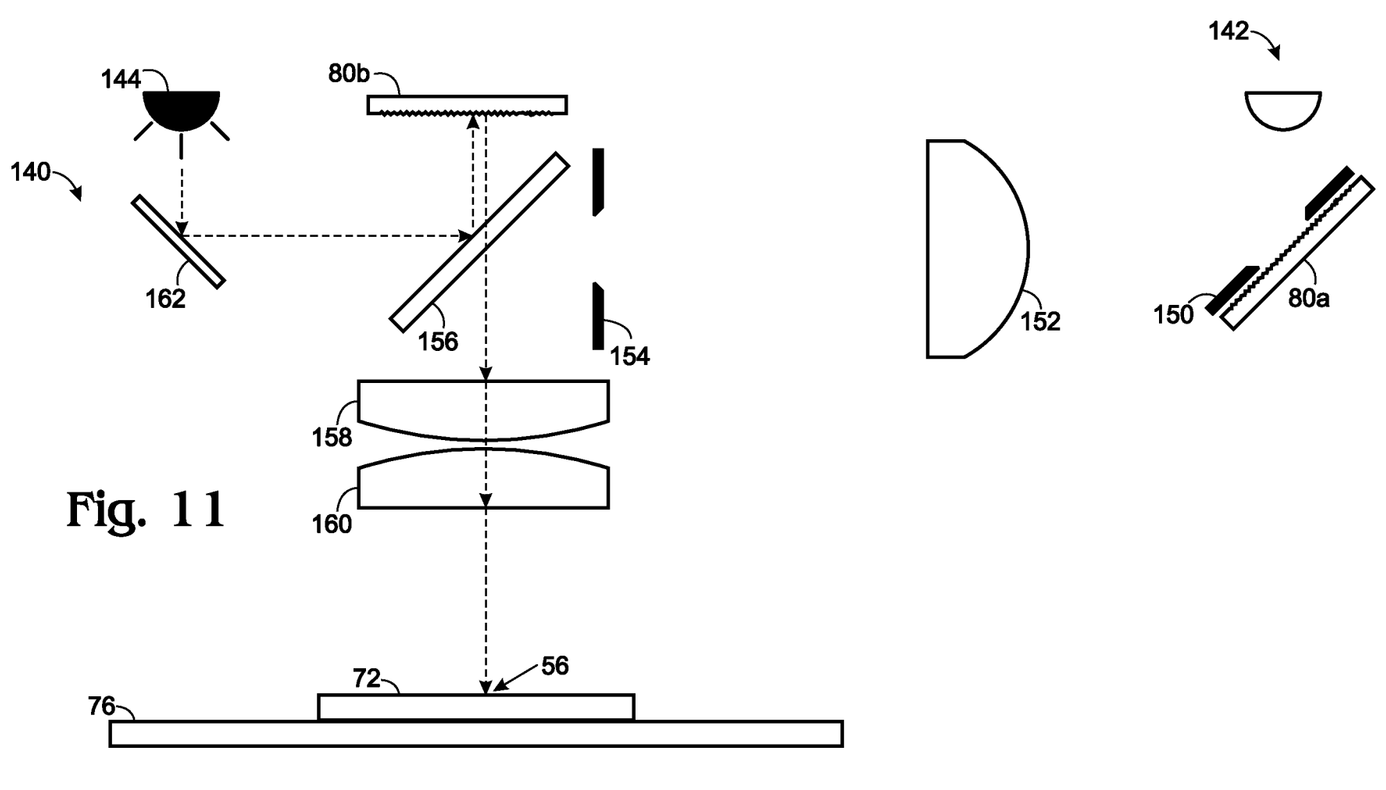
FIG. 11 is another schematic view of the trans-illumination portion of FIG. 10 and illustrating an optical path from the image autofocusing light source to the examination region.
Figure 12:
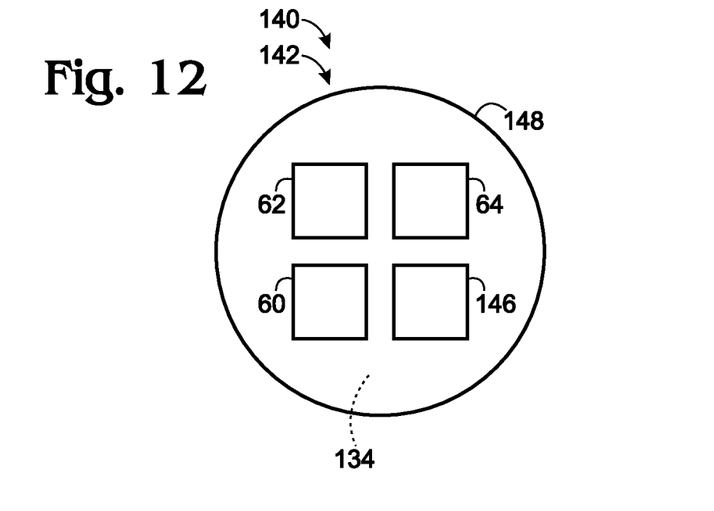
FIG. 12 is a view of a source assembly including the colorimetric imaging light sources, taken generally along line 12-12 of FIG. 10.

This example describes an exemplary colorimetric imaging system 140 having a pair of reflective diffusers 80a, 80b; see FIGS. 10-12.

FIGS. 10 and 11 show only of a trans-illumination portion of system 140. The system also has an epi-illumination portion 54 and a detection portion 58 both located below stage 76, as described above for system 50 (e.g., see FIGS. 1A and 1B). More generally, system 140 may have any suitable combination of elements and features present in imaging system 50 of Section I.

System 140 includes a trans-illumination source assembly 142 and a separate image autofocusing source 144 for trans-illumination of the examination region (see FIGS. 10 and 12). Source assembly 142 may have any of the elements and features described above for source assembly 132 (see FIG. 7), including an array of red, green, and blue light sources 60, 62, and 64 (see FIG. 12). A white light source 146 also may be provided by source assembly 142. Each of sources 60, 62, 64, and 146 may be a light-emitting diode formed by a die (also called a chip). Each die, shown here as rectangular, may be mounted on the same support 148. The dies may be disposed in a two-dimensional array, such as two-by-two array as shown, or may be arranged in a line, among others. The dies collectively may be disposed under and/or embedded in a polymer cover attached to support 148. The polymer cover may protect the dies and function as an optical element that transmits light from the dies out of source assembly 142. In some embodiments, source assembly 142, instead of image autofocusing source 144, may produce trans-illumination light used for autofocusing.

FIG. 10 shows an optical path followed by light from source assembly 142 to examination region 56. To simplify the presentation, source assembly 142 is illustrated here as a single light source. Trans-illumination light for colorimetric imaging travels from the source assembly to reflective diffuser 80a, which reflectively scatters the light incident on an irregular, reflective surface of the diffuser. The size of the reflective surface that reflects the light may be restricted by an aperture-defining mask 150 operatively associated with diffuser 80a. The reflected light may pass, in order, through a hemispherical collection lens 152, an aperture-defining element 154, and to a beam-splitter 156. The beam-splitter may be partially reflective (R) and partially transmissive (T) (e.g., 70% R, 30% T), such that only part of the light is reflected to a condenser formed by a pair of lenses 158, 160, which in turn transmit the light to examination region 56. Light rays from source assembly 142 may pass through examination region 56 parallel to one another, to provide Köhler illumination. The light then is collected and focused onto an image detector as described above.

FIG. 11 shows an optical path followed by light from image autofocusing source 144 to examination region 56. Trans-illumination light for image autofocusing travels from source 144 to mirror 162, which reflects the light toward beam-splitter 156. A portion of the light is reflected by beam-splitter 156 toward reflective diffuser 80b, which reflectively scatters the light received with an irregular, reflective surface of the diffuser. The size of the reflective surface that reflects the light may or may not be restricted by an aperture-defining mask operatively associated with diffuser 80b (as for diffuser 80a). A portion of the reflected, scattered light may pass through beam-splitter 156, lenses 158, 160, and examination region 56. The light then is collected and focused onto an image detector as described above.

Further aspects of image autofocusing that may be included in system 140 are described in U.S. patent application Ser. No. 14/886,998, filed Oct. 19, 2015, which is incorporated herein by reference.

The disclosure set forth above may encompass one or more distinct inventions, with independent utility. Each of these inventions has been disclosed in its preferred form(s). These preferred forms, including the specific embodiments thereof as disclosed and illustrated herein, are not intended to be considered in a limiting sense, because numerous variations are possible. The subject matter of the inventions includes all novel and nonobvious combinations and subcombinations of the various elements, features, functions, and/or properties disclosed herein.

The invention claimed is:
1. An imaging system, comprising:
a plurality of trans-illumination light sources comprising optical components configured to irradiate an examination region with different colors of trans-illumination light;
a same diffuser present in each optical path from the trans-illumination light sources to the examination region;
an excitation light source configured to irradiate the examination region with excitation light to induce photoluminescence;
an image detector configured to detect grayscale images of the examination region and detect the photoluminescence from the examination region, wherein the diffuser reduces background autofluorescence from the optical components detected by the image detector; and
a processor configured to create a color trans-illumination image from grayscale images; wherein the imaging system is configured to irradiate the examination region with trans-illumination light from each of the trans-illumination light sources and with excitation light from the excitation light source without moving one or more parts in any of the optical paths from the trans-illumination light sources to the examination region.

2. The imaging system of claim 1, wherein
the plurality of trans-illumination light sources are offset from one another transverse to a central optical axis extending from the plurality of trans-illumination light sources to the diffuser,
an aperture proximate the diffuser is in the optical path from the trans-illumination light sources to the examination region, and
the excitation light exciting the optical components and background autoflourescence from the optical components caused by the excitation light are both scattered by the diffuser and both partially blocked by the aperture proximate the diffuser so as to reduce the background autofluorescence detected by the image detector.

3. The imaging system of claim 1, wherein the diffuser is configured to scatter light from the excitation light source and from each trans-illumination light source substantially isotropically over a solid angle of at least $\pi$ steradians or about $2\pi$ steradians.

4. The imaging system of claim 1, wherein excitation light produced by the excitation light source is incident on a source assembly including the optical components of the plurality of the trans-illumination light sources, but with an efficiency of less than 0.1%.

5. The imaging system of claim 4, wherein the source assembly includes one or more photoluminescent substances, and wherein photoluminescence excited by the excitation light source from the one or more photoluminescent substances is transmitted to the image detector with an efficiency of less than 0.1%.

6. The imaging system of claim 5, wherein the diffuser comprises a reflective diffuser, and each of the plurality of trans-illumination light sources includes a light-emitting diode and wherein trans-illumination light from each trans-illumination light source passes through two apertures as the trans-illumination light travels from the trans-illumination light source to the examination region.

7. The imaging system of claim 6, wherein the plurality of trans-illumination light sources includes a red light source, a green light source, and a blue light source.

8. The imaging system of claim 1, wherein the processor is configured to create a color image by combining grayscale images of the examination region detected separately during irradiation with trans-illumination light from each of the trans-illumination light sources while each of the other trans-illumination light sources is not substantially producing light.

9. The imaging system of claim 1, wherein the imaging system is configured to irradiate the examination region with trans-illumination light from each of the trans-illumination light sources while an optical path from each trans-illumination light source to the examination region remains unaltered.

10. The imaging system of claim 1, wherein the imaging system is configured to irradiate the examination region with trans-illumination light from each of the trans-illumination light sources without moving any light source or optical element of the system.

11. The imaging system of claim 1, wherein the imaging system is configured to switch from a trans-illumination mode to an epi-illumination mode, and vice versa, without altering any optical path from a light source to the examination region.

12. A method of imaging, the method comprising:
irradiating a sample with trans-illumination light of different colors produced by a plurality of trans-illumination light sources comprising optical components, wherein a same diffuser is present in each optical path from the trans-illumination light sources to the examination region;
irradiating the sample with excitation light from an excitation light source to induce photoluminescence, wherein the diffuser reduces background autofluorescence from the optical components detected by the image detector;
detecting by an image detector a photoluminescence image of the sample;
detecting by the image detector grayscale images of representing irradiation with different subsets of the trans-illumination light sources; and
creating a color image using image data from a plurality of the grayscale images; wherein both steps of irradiating are performed while each optical path from the trans-illumination light sources to the examination region remains the same without movement of one or more parts in any of the optical paths from the trans-illumination light sources to the examination region.

13. The method of claim 12, wherein the step of irradiating a sample with trans-illumination light is performed while the plurality of trans-illumination light sources are offset from one another transverse to a central optical axis extending from the plurality of trans-illumination light sources to the diffuser.

14. The method of claim 12, wherein the step of irradiating a sample with trans-illumination light includes a step of scattering the trans-illumination light from each light source with the diffuser substantially isotropically over a solid angle of at least $\pi$ steradians.

15. The method of claim 12, wherein the step of irradiating the sample with excitation light includes a step of transmitting excitation light from the excitation light source to a light source assembly including the plurality of trans-illumination light sources with an efficiency of less than 0.1%.

16. The method of claim 15, wherein the step of irradiating the sample with excitation light includes a step of transmitting photoluminescence from the light source assembly to an image detector with an efficiency of less than 0.1%.

17. The method of claim 12, wherein the step of irradiating a sample with trans-illumination light includes a step of separately irradiating the sample with each of at least three trans-illumination light sources, and wherein the step of creating a color image includes a step of combining respective grayscale images detected during irradiation with each of the at least three trans-illumination light sources.

18. The method of claim 12, wherein the step of irradiating a sample with trans-illumination light includes a step of reflectively scattering trans-illumination light originating from each of the trans-illumination light sources.

19. The method of claim 12, wherein the step of creating a color image includes a step of combining grayscale images detected separately during irradiation with trans-illumination light from each of the trans-illumination light sources while each of the other trans-illumination light sources is not substantially producing light.

* * * * *